July 28, 1931.  W. H. PARKER ET AL  1,816,609
LIQUID DISPENSING APPARATUS
Filed Feb. 17, 1926
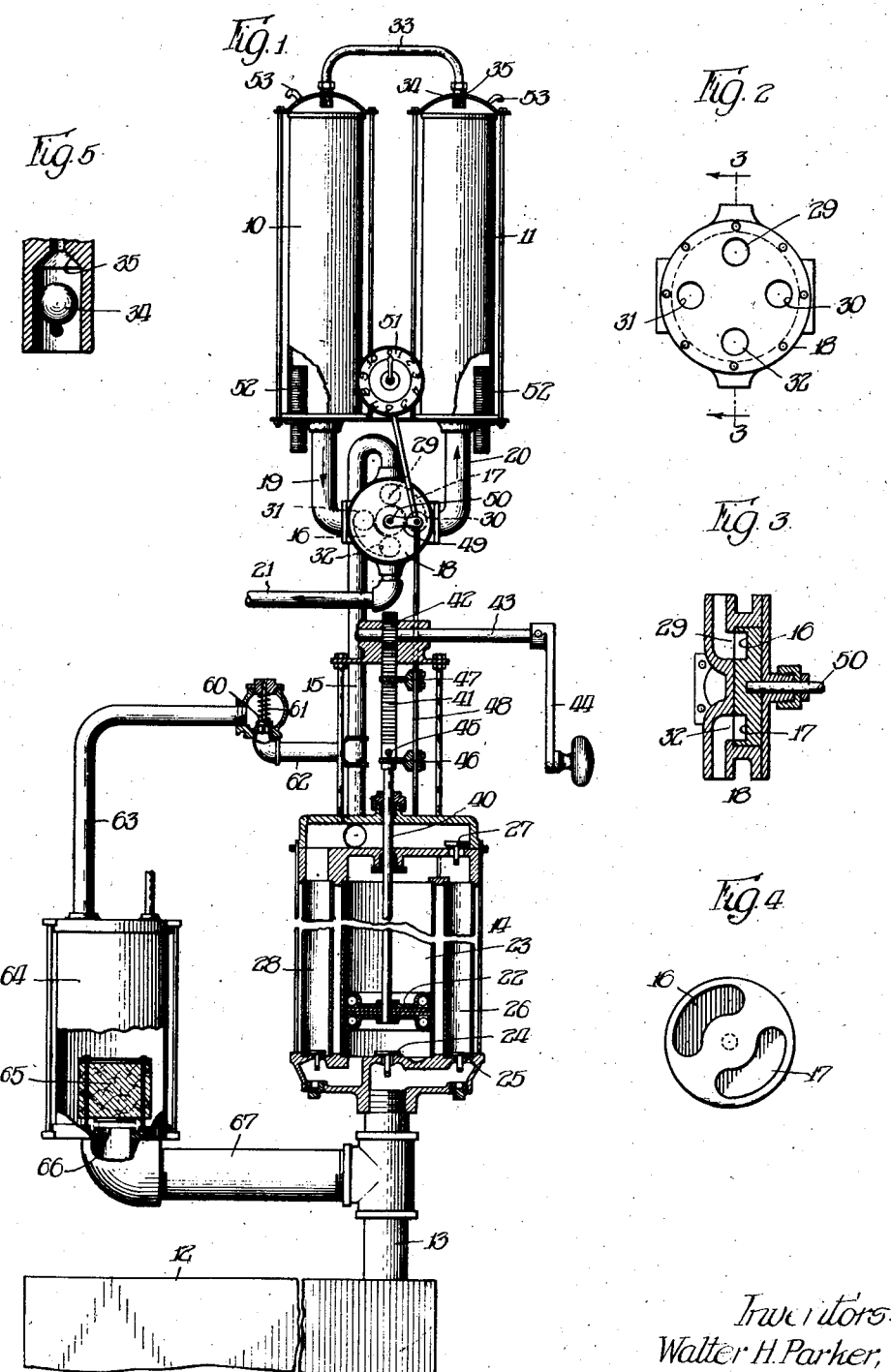
Inventors:
Walter H. Parker,
Frederick W. Delanoy, Patented July 28, 1931

1,816,609

UNITED STATES PATENT OFFICE

WALTER H. PARKER AND FREDERICK W. DELANOY, OF ROCHESTER, PENNSYLVANIA, ASSIGNORS, BY MESNE ASSIGNMENTS, TO THE WAYNE PUMP COMPANY, OF BALTIMORE, MARYLAND, A CORPORATION OF MARYLAND

LIQUID DISPENSING APPARATUS

Application filed February 17, 1926. Serial No. 88,770.

This invention relates to liquid dispensing apparatus.

One object of the invention is to provide simple, reliable and efficient liquid dispensing apparatus which will permit a continuous flow of liquid to be measured and dispensed, thereby reducing to a minimum the time required for supplying a motor vehicle.

Another object is to provide apparatus of the above mentioned type in which liquid is accurately measured and dispensed.

Another object is to provide apparatus of the type indicated in which the various parts of the apparatus are timed and controlled to secure accurate measurement of liquid and facilitate the dispensing thereof.

Another object is to alternately supply to each of a plurality of measuring chambers a predetermined amount of liquid, any excess supplied liquid being diverted in a controlled manner.

Another object is to control the various parts of the apparatus and the flow of liquid in a manner to meet all of the requirements for successful commercial use.

These and other objects are accomplished by means of the arrangement disclosed on the accompanying sheet of drawings, in which—

Figure 1 is a vertical longitudinal sectional view, parts being in elevation, of liquid dispensing apparatus embodying my invention;

Figure 2 is a detail front elevation of the four-way control valve by means of which flow of liquid between the source of supply, measuring chambers and dispensing line is controlled;

Figure 3 is a detail vertical sectional view of the valve taken in the plane of line 3—3 of Figure 2;

Figure 4 is a detail front elevation of the rotary valve member; and,

Figure 5 is a fragmentary detail sectional view of the air connection between the measuring chambers and showing one of the float valves.

The various novel features of the invention will be apparent from the following description and drawings, and will be particularly pointed out in the appended claims.

Referring to the figures of the drawings in which the apparatus is shown somewhat diagrammatically, it will be noted that the invention is illustrated in connection with continuous flow liquid dispensing apparatus including two preferably transparent measuring chambers 10 and 11 into which liquid is forced from any suitable source represented by the liquid storage tank 12, the liquid being drawn therefrom, in this instance, through a pipe 13 by a pump 14 and then forced through a pipe 15 alternately through passages 16 and 17 in valve 18 and respectively through pipes 19 and 20 into said measuring chambers 10 and 11 respectively. After the liquid is measured within the measuring chambers 10 and 11, it is discharged alternately from said chambers through the same pipes 19 and 20 and through passageways in valve 18 and out through the dispensing or service pipe 21 to which a hose or the like may be connected.

More specifically considered, the pump 14 in this instance is a double acting reciprocatory type of pump having a piston 22 which is reciprocated within the cylinder 23 of the pump. On the up stroke of the piston 22 liquid is drawn through the pipe 13 and past valve 24 for filling the pump cylinder 23 below the piston 22. At the same time liquid which previously has been drawn past valve 25 up through passageway 26 and into the upper part of cylinder 23, is forced upwardly and outwardly by the piston 22 from said cylinder 23 past the valve 27 and upwardly through the pipe 15 on its way through the oscillatory or reversing control valve 18 and into the measuring chambers 10 and 11. On the down stroke of the piston 22 liquid is forced out of the cylinder 23, upwardly through pump passageway 28 through pipe 15 toward the measuring chambers 10 and 11. It is seen, therefore, that this double acting pump furnishes a continuous flow of liquid to the measuring chambers 10 and 11. Also the flow of liquid through the dispensing pipe 21 may be continuous, for as one measuring chamber, for example chamber 10, is being filled with liquid, the other measuring chamber 11 is discharging its measured liquid, and vice versa.

As shown in Figure 1 of the drawings, liquid is being pumped from supply pipe through valve port 29, valve arcuate passageway 17, valve port 30, pipe 20 into the measuring chamber 11. At the same time, liquid which has been measured in measuring chamber 10 is passed downwardly and outwardly through pipe 19, valve port 31, valve arcuate passageway 16, valve port 32, and out through dispensing pipe 21. As liquid rises in the measuring chamber 11, air is forced by said rising liquid from the upper part of said measuring chamber through an air pipe 33 into the upper part of measuring chamber 10. Air will continue to be transferred from chamber 11 to chamber 10 until the liquid rises up into engagement with and presses a float valve 34 into closed position against its seat 35. When the float valve 34 closes, the supply of liquid to the measuring chamber ceases, in spite of the fact that the capacity of the pump 14 is in excess of the capacity of either of the measuring chambers 10 and 11. As a result thereof, the pump continuing its same pumping stroke, liquid pressure is built up in the supply pipe 15. When this liquid pressure rises above a certain predetermined value, a relief valve 60 is opened against the pressure of its backing spring 61, whereby the excess pumped liquid will flow from supply pipe 15, through excess flow pipe 62, past valve 60, through excess flow pipe 63 and into an excess flow receptacle 64. Mounted within said receptacle 64 is a float valve 65 which controls the exit of liquid therefrom. When the liquid is below a certain predetermined level, the float valve seals the exit opening 66, but when the liquid is above said level, the float valve 65 rises permitting liquid to flow from the excess flow receptacle 64, from which said liquid is drawn by the pump 14, through the return pipe 67, back to pipe 13 and then through the pump and up through supply pipe 15. In the mean time, however, the reversing valve 18 has been shifted, through mechanism to be described hereinafter, permitting the passage of the measured liquid from the measuring chamber 11 and for permitting the flow of liquid into the measuring chamber 10. By means of this by-pass around the supply pipe or excess flow connection, the use of overflow pipes for the measuring chambers 10 and 11 is obviated. It will be understood that the operation is the same when the measuring chamber 10 has been filled with liquid, the excess amount of pumped liquid passing around the connection including the excess flow receptacle 64.

In connection with the supply of liquid to the measuring chambers 10 and 11, the capacity of the pump 14 is sufficiently large, and said pump is so timed with respect to the reversing control valve 18 that the measuring chambers are filled and an excess amount of liquid pumped before the reversing valve is reversed for permitting reverse passage of the liquid to and from said chambers.

With respect to the time relationship between the pump 14 and the reversing valve 18, it will be noted that the pump piston 22 has a rod 40 terminating in a rack 41 meshing with and actuated by a gear 42 mounted upon a shaft 43 having a crank 44 which may be operated either by hand or by a motor. A pin 45 projects from the rack 41 and at the end of the piston strokes is adapted alternately to engage arms 46 and 47 which are adjustably fixed to a rod 48 connected at its upper end to an arm 49 on shaft 50 of the valve 18. Accordingly, it will be seen that when the piston 22 has about reached the lower end of its downward stroke, the pin 45 will be forced into engagement with the arm 46 for reversing the valve 18 from its position shown in Figure 1 into a position corresponding to that shown in Figure 4. Under such circumstances it will be seen that the measured liquid in chamber 11 will then be discharged through pipe 20, port 30, valve passageway 17, port 32 and dispensing line 21. At the same time, liquid will be supplied through the supply pipe 15, port 29, valve passageway 16, port 31 and pipe 19 to the measuring chamber 10. By virtue of the fact that the pump is of such capacity as to fill either of the measuring chambers 10 or 11, and supply an excess amount in addition upon a single stroke, the control reversing valve 18 may be given a reversing movement timed to the operation of the pump, such actuation of the valve being entirely automatic.

Indicating mechanism 51 may be operatively connected to the reversing valve in any desirable manner to indicate the number of gallons measured. Calibrating plugs 52 are shown for calibrating the measuring chambers 10 and 11. Suitable vent control connections 53 are provided at the upper end of each of the measuring chambers 10 and 11 to connect the interior of said chambers to the atmosphere when it is desired to empty said measuring chambers when the other of said chambers is not being filled.

It is our intention to cover all modifications of the invention falling within the spirit and scope of the following claims.

We claim:

1. In liquid dispensing apparatus, the combination of an elevated measuring chamber, a source of liquid supply, a supply pipe associated with said chamber and source of supply and through which liquid is supplied to said measuring chamber, discharge means, a valve for alternately connecting said measuring chamber to said supply pipe and to said discharge means whereby said chamber may be filled and emptied, an excess flow receptacle connected to said supply pipe below said measuring chamber and said valve whereby when said measuring chamber has received a predetermined amount of liquid and when said valve is connecting said chamber and said discharge means, any excess amount of liquid will be diverted to said excess flow receptacle, and means in said receptacle for closing communication between said receptacle and a connection to said source of supply whereby liquid will not be by-passed around said chamber before said chamber is filled.

2. In liquid dispensing apparatus, the combination of a measuring chamber, a supply pipe through which liquid is supplied to said measuring chamber, discharge means, a valve for alternately connecting said measuring chamber to said supply pipe and to said discharge means whereby said chamber may be filled and emptied, an excess flow receptacle connected to said supply pipe whereby when said measuring chamber has received a predetermined amount of liquid, any excess amount of liquid will be diverted to said excess flow receptacle, and means for controlling discharge of liquid from said excess flow receptacle.

3. In liquid dispensing apparatus, the combination of a measuring chamber, a supply pipe through which liquid is supplied to said measuring chamber, discharge means, a valve for alternately connecting said measuring chamber to said supply pipe and to said discharge means whereby said chamber may be filled and emptied, a pump for forcing the liquid through said pipe, a by-pass connection around said supply pipe and connected thereto on opposite sides of said pump whereby after said measuring chamber has received a certain quantity of liquid, excess pumped liquid will be forced from said supply pipe on one side of said pump through said bypass connection and returned to said supply pipe on the other side of said pump, and means responsive to liquid pressure in said by-pass connection for controlling the flow of liquid therethrough.

4. In liquid dispensing apparatus, the combination of a measuring chamber, a supply pipe through which liquid is supplied to said measuring chamber, discharge means, a valve for alternately connecting said measuring chamber to said supply pipe and to said discharge means whereby said chamber may be filled and emptied, a pump for forcing the liquid through said pipe, a by-pass connection around said supply pipe and connected thereto on opposite sides of said pump whereby after said measuring chamber has received a certain quantity of liquid, excess pumped liquid will be forced from said supply pipe on one side of said pump through said by-pass connection and returned to said supply pipe on the other side of said pump, means responsive to liquid pressure in said by-pass connection for controlling the flow of liquid therethrough, and a valve between said measuring chamber and said pump for controlling the flow of liquid to said measuring chamber.

5. In liquid dispensing apparatus, the combination of a plurality of measuring chambers, means for supplying liquid thereto, a valve for controlling the flow of liquid alternately to said chambers, a connection between said chambers, and means for closing said connection when a predetermined amount of liquid has been supplied to said chambers, and a valve controlled excess flow pipe connected to said supply pipe whereby when either of said measuring chambers has received a predetermined amount of liquid, any excess amount of liquid will be diverted through said excess flow pipe.

6. In liquid dispensing apparatus, the combination of a plurality of measuring chambers, means for supplying liquid thereto, a valve for controlling the supply of liquid to and the discharge of liquid from said chambers, a connection between said chambers, and means for closing said connection when a predetermined amount of liquid has been supplied to said chambers, an excess flow receptacle, and a valve controlled excess flow pipe between said liquid supply means and said excess flow receptacle whereby when either of said measuring chambers has received a predetermined amount of liquid, any excess amount of liquid will be diverted through said excess flow pipe and excess flow receptacle.

7. In liquid dispensing apparatus, the combination of a plurality of measuring chambers, means for supplying liquid thereto, a valve for controlling the supply of liquid to and the discharge of liquid from said chambers, a connection between said chambers and means for closing said connection when a predetermined amount of liquid has been supplied to said chambers, an excess flow receptacle, a valve controlled excess flow pipe between said liquid supply means and said excess flow receptacle whereby when either of said measuring chambers has received a predetermined amount of liquid, any excess amount of liquid will be diverted through said excess flow pipe and excess flow receptacle, and another connection between said excess flow receptacle and said supply pipe whereby liquid may be returned to said supply pipe from said excess flow receptacle.

8. In liquid dispensing apparatus, the combination of a plurality of measuring chambers, means for supplying liquid thereto, a valve for controlling the supply of liquid to and the discharge of liquid from said chambers, a connection between said chambers, and means for closing said connection when a predetermined amount of liquid has been supplied to said chambers, an excess flow receptacle, a valve controlled excess flow pipe between said liquid supply means and said excess flow receptacle whereby when either of said measuring chambers has received a predetermined amount of liquid, any excess amount of liquid will be diverted through said excess flow pipe and excess flow receptacle, and another connection between said excess flow receptacle and said supply pipe whereby liquid may be returned to said supply pipe from said excess flow receptacle, and normally closed means on said excess flow receptacle preventing liquid return to said supply pipe until only when a certain amount of liquid has been supplied to said receptacle.

Signed at Rochester, Pennsylvania, this 11th day of February, 1926.

WALTER H. PARKER.
FREDERICK W. DELANOY.